United States Patent
Kuipers et al.

(10) Patent No.: US 11,661,111 B2
(45) Date of Patent: May 30, 2023

(54) ROCKER ASSEMBLY INSERT WITH OPPOSED CRUSH CHANNELS

(71) Applicant: Shape Corp., Grand Haven, MI (US)

(72) Inventors: Matthew Kuipers, Holland, MI (US); Zehua Qin, Norton Shores, MI (US); Kannan Ramamoorthy, Holland, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 17/464,078

(22) Filed: Sep. 1, 2021

(65) Prior Publication Data

US 2022/0063728 A1    Mar. 3, 2022

Related U.S. Application Data

(60) Provisional application No. 63/073,120, filed on Sep. 1, 2020.

(51) Int. Cl.
*B62D 25/02*    (2006.01)
*B62D 21/15*    (2006.01)

(52) U.S. Cl.
CPC ......... *B62D 25/025* (2013.01); *B62D 21/157* (2013.01)

(58) Field of Classification Search
CPC ............................ B62D 25/025; B62D 21/157
USPC ............................................. 296/209, 187.12
See application file for complete search history.

(56) References Cited

U.S. PATENT DOCUMENTS

| | | | | |
|---|---|---|---|---|
| 5,033,593 A | * | 7/1991 | Kazuhito | ............... B60J 5/0443 293/133 |
| 5,924,765 A | | 7/1999 | Lee | |
| 6,092,555 A | * | 7/2000 | Otsuka | ................... B60J 5/0443 296/193.06 |
| 6,705,668 B1 | * | 3/2004 | Makita | ................. B62D 25/025 296/187.03 |
| 7,618,082 B2 | * | 11/2009 | Tamada | ................. B60R 19/18 296/187.05 |
| 9,493,190 B1 | * | 11/2016 | Alwan | ................. B62D 25/025 |
| 9,896,133 B2 | * | 2/2018 | Elfwing | ............... B62D 29/008 |

(Continued)

FOREIGN PATENT DOCUMENTS

| | | |
|---|---|---|
| EP | 1806271 A2 | 7/2007 |
| JP | 2007283868 A | 11/2007 |

(Continued)

OTHER PUBLICATIONS

Translation of KR200182555 (Year: 2000).*
International Search Report for PCT/US2021/048670 dated Feb. 17, 2022; 2 pp.

*Primary Examiner* — Dennis H Pedder
(74) *Attorney, Agent, or Firm* — Bodman PLC

(57) ABSTRACT

A vehicle rocker assembly includes an outer sill member and an inner sill member attached longitudinally along the outer sill member to define a hollow space along and between the inner and outer sill members. A tubular insert is disposed in the hollow space so as to extend longitudinally along the hollow space. The tubular insert has a crush control feature extending longitudinally along a wall of the tubular insert, such as upper and lower walls at opposing sides of the interior volume. The tubular insert is configured for side impact forces at the outer sill member to laterally deform the tubular insert at the crush control feature to provide an accordion-style lateral crush to absorb the side impact forces.

19 Claims, 4 Drawing Sheets

(56) References Cited

U.S. PATENT DOCUMENTS

| | | | |
|---|---|---|---|
| 11,046,367 B2 * | 6/2021 | Arvidsson | B62D 25/2036 |
| 11,572,103 B2 * | 2/2023 | Limousin | B62D 21/157 |
| 2013/0026786 A1 * | 1/2013 | Saeki | B60K 1/04 |
| | | | 296/187.08 |

FOREIGN PATENT DOCUMENTS

| | | | | |
|---|---|---|---|---|
| KR | 200182555 Y1 * | 6/2000 | | B62D 25/025 |
| WO | 2021071410 A1 | 4/2021 | | |

* cited by examiner

ROCKER ASSEMBLY INSERT WITH OPPOSED CRUSH CHANNELS

CROSS-REFERENCE TO RELATED APPLICATION

This application claims priority under 35 U.S.C. § 119(e) to U.S. Provisional Patent Application No. 63/073,120, filed Sep. 1, 2020, the disclosure of this prior application is considered part of this application and is hereby incorporated by reference in its entirety.

TECHNICAL FIELD

The present disclosure relates to rocker and sill assemblies for vehicles, such as rocker structures having reinforcement inserts.

BACKGROUND

Vehicles typically have a rigid frame and body structure, which is commonly referred to as a unibody frame. The vehicle frame and body structures are designed to support the vehicle during operation and to undergo and absorb certain levels of impact forces, such as to prevent distances of intrusion to the vehicle cabin, trunk, engine compartment, or the like in accordance with insurance requirements and other regulatory and legal requirements. With respect to impact reinforcement and structural beams used in a vehicle body or frame, it is generally known that these beams may be reinforced with interior inserts to increase stiffness. Rocker assemblies extend longitudinally along lower portions of unibody vehicle frames and are known to have inserts to increase stiffness, such as to reduce side impact intrusion.

SUMMARY

The present disclosure provides a rocker assembly for a vehicle body frame that includes a hollow external structure formed with attached inner and outer sill members. A reinforcement insert is disposed within and extends longitudinally along an interior space of the hollow external structure. The reinforcement insert has a cross-sectional profile that is generally consistent along a length of the rocker assembly, such as to provide a tubular shape with one or more enclosed tubular sections. The reinforcement insert may be roll-formed, stamped, or extruded to have the consistent cross-sectional profile, such as the closed or otherwise tubular cross-sectional shape. To increase impact energy absorption from side impact forces delivered to the outer sill member, such as a side pole impactor, the reinforcement insert is provided with one or more lateral crush control features. The crush control features assist with controlling the lateral compression and deformation of the rocker assembly while undergoing impact forces, such as by causing the side impact forces to laterally deform the tubular insert in an accordion-style lateral crush. The crush control features may be provided as crush channels formed along the reinforcement insert, such as to protrude into an interior volume of a tubular shape. The crush channels may be arranged at opposing sides of the reinforcement insert, such as at upper and lower walls of an enclosed tubular section of the reinforcement insert, for side impact forces to laterally deform the tubular insert at the crush channels and provide an inward or outward folded deformation, such as an accordion-style lateral crush.

According to one aspect of the present disclosure, a vehicle rocker assembly includes an outer sill member and an inner sill member attached longitudinally along the outer sill member to define a hollow space along and between the inner and outer sill members. A tubular insert is disposed in the hollow space so as to extend longitudinally along the hollow space. The tubular insert has an upper wall and a lower wall that border opposite sides of an interior volume of the tubular insert. The upper wall and/or lower wall of the tubular insert has a crush channel extending longitudinally along the tubular insert. The crush channel or channels are configured for side impact forces at the outer sill member to laterally deform the tubular insert to provide an accordion-style lateral crush to at least partially absorb the side impact forces.

Implementations of the disclosure may include one or more of the following optional features. In some implementations, the tubular insert includes an outer tubular section and an inner tubular section integrally formed together and disposed laterally adjacent to each other. The outer tubular section and the inner tubular section may share a common center wall that extends vertically between the upper and lower walls of the tubular insert. In some examples, the outer tubular section has an outer wall that faces the outer sill member and is integrally interconnected between the upper and lower walls of the tubular insert.

In some implementations, the crush channel or channels protrude into the interior volume of the tubular insert, and with two or more channels may be disposed at the upper and lower walls at opposing sides of the interior volume. In some examples, the crush channels may be are mirrored across the interior volume of the tubular insert, such as at the outer tubular section or the inner tubular section. In other examples, the crush channels are vertically staggered relative to each other. Further, the upper and lower walls of the tubular insert may be disposed in planar parallel alignment with each other or may have a tapered shape. The crush channels in some examples are vertically aligned across the interior volume of the outer tubular section, such as perpendicularly relative to the upper and lower walls. The crush channels of the tubular insert may be configured to simultaneously deform under the side impact forces at the outer sill member.

With respect to fixation of the tubular insert, a bracket may be attached between upper flanges of the outer and inner sill members, where the bracket is attached to and supporting the tubular insert in the hollow space. Also, in some implementations, the tubular insert includes a flange that is attached between upper flanges of the outer and inner sill members, where the flange supports the tubular insert in the hollow space. Further, the tubular insert may be fixed at an interior surface of the outer sill member or the inner sill member, such as via at least one of a weld, a fastener, or an adhesive.

In some examples, the tubular insert comprises a metal sheet formed to have an outer tubular section and an inner tubular section that share a common center wall, the outer and inner tubular sections disposed laterally adjacent to each other. Alternatively, the tubular insert may be longitudinally extruded to have an outer tubular section and an inner tubular section that share a common wall that integrally interconnects with the upper and lower walls of the tubular insert.

The details of one or more implementations of the disclosure are set forth in the accompanying drawings and the

BRIEF DESCRIPTION OF THE DRAWINGS

Like reference symbols in the various drawings indicate like elements.

DETAILED DESCRIPTION

Figure 1:
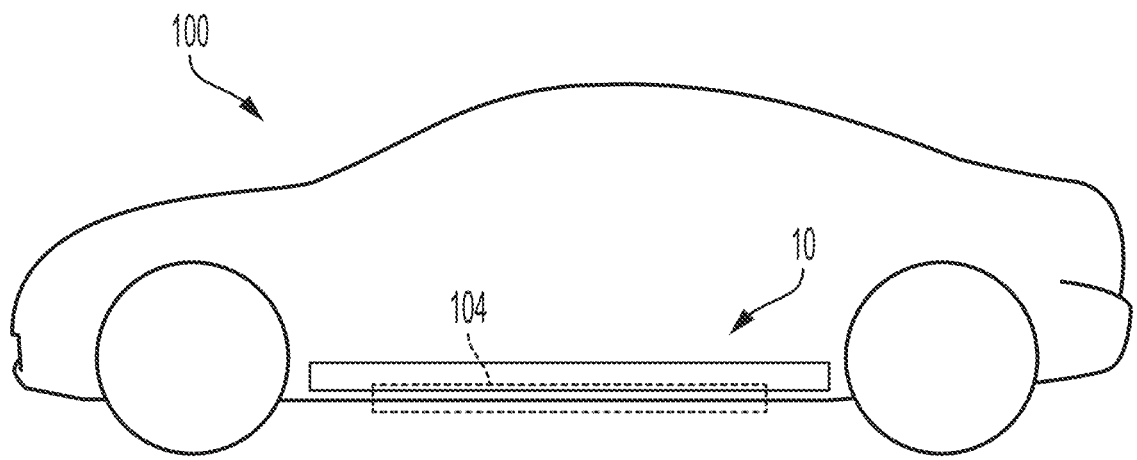
FIG. 1 is a side elevation view of a profile of a vehicle schematically illustrating a location of a rocker assembly.
Figure 2:
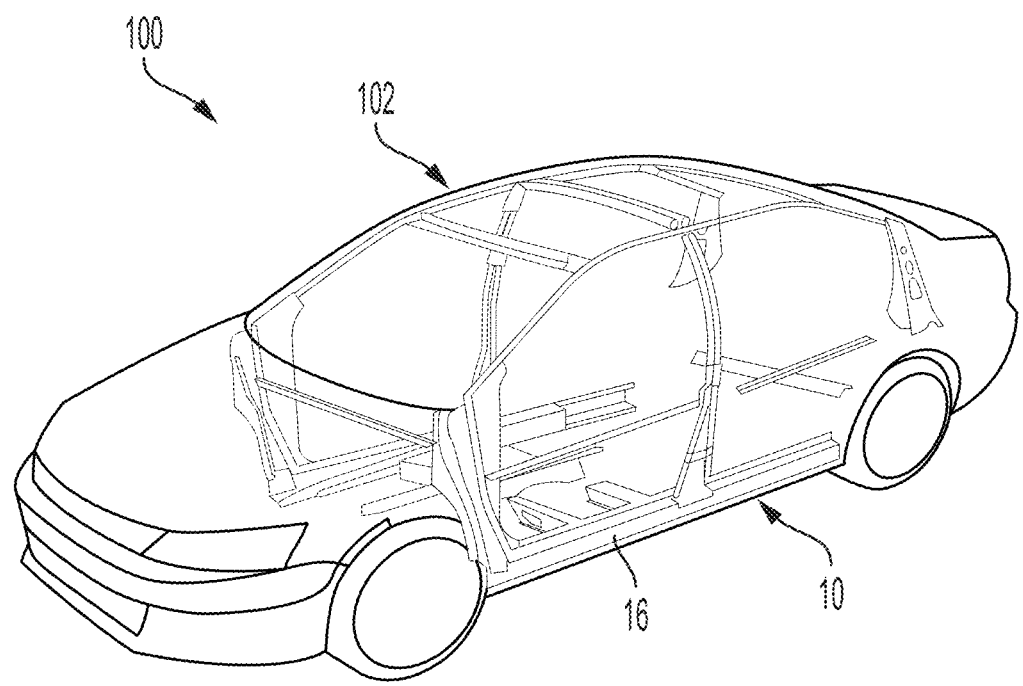
FIG. 2 is an upper perspective view of the vehicle of FIG. 1, showing the rocker assembly and various other structural beams.

Referring now to the drawings and the illustrative embodiments depicted therein, a reinforced rocker assembly 10 is provided for a body structure or frame 102 of a vehicle 100, such as shown in FIGS. 1 and 2. The vehicle frame and associated rocker assembly may have various designs and configurations, such as for different styles and types of vehicles. As shown for example in FIG. 1, the vehicle 100 may at least partially operate a propulsion system of the vehicle with a battery, such as a traction battery or battery modules, that may be supported in a battery tray 104 generally located between the axles and near the floor of the vehicle 100 to distribute the battery weight and establish a low center of gravity for the vehicle.

Figure 3:
FIG. 3 is a top plan view of a rocker assembly.
Figure 4:
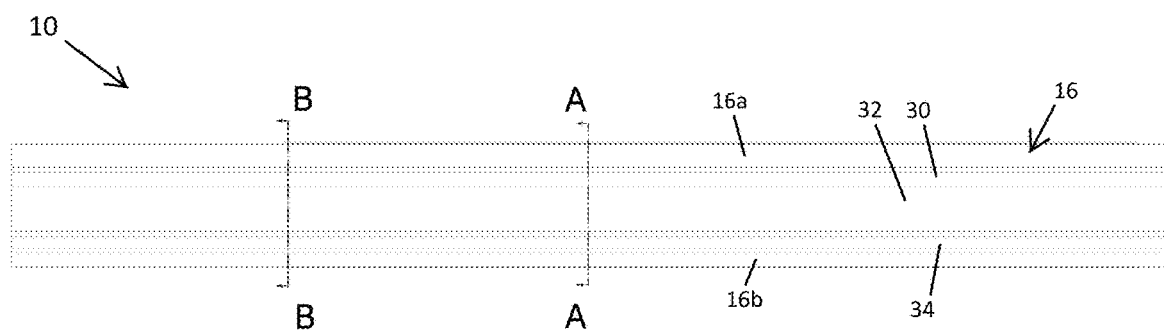
FIG. 4 is a side elevation view of the rocker assembly shown in FIG. 3.
Figure 4A:
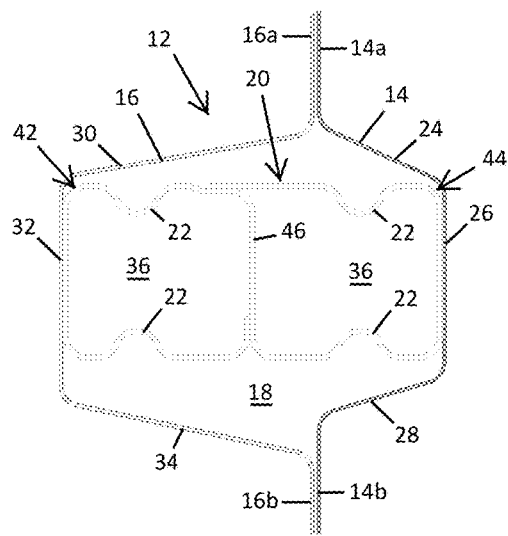
FIG. 4A is a cross-sectional view of the rocker assembly taken at line A-A in FIG. 4.
Figure 4B:
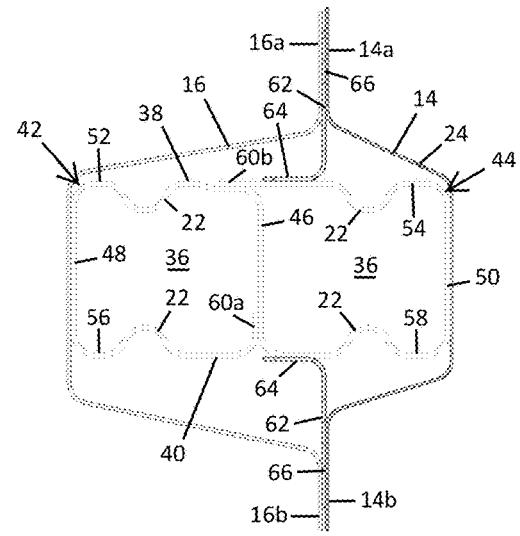
FIG. 4B is a cross-sectional view of the rocker assembly taken at line B-B in FIG. 4.

The vehicle rocker assembly 10, as shown for example in FIGS. 3-4B, includes a hollow external structure 12 that is formed with an inner sill member 14 and an outer sill member 16, which can also be referred to as a rocker panel or section. The inner sill member 14 is attached longitudinally along the outer sill member 16 to define an elongated hollow space 18 between the inner and outer sill members 14, 16. The inner and outer sill members 14, 16 that form the external structure 12 surround the elongated hollow space 18 between the inner and outer sill members 14, 16. A reinforcement insert 20 is disposed in the hollow space 18 of the external rocker structure 12 and extends longitudinally along at least a portion or longitudinal section of the hollow space 18. The reinforcement insert 20 has a cross-sectional profile that is generally consistent along its length, such as a tubular shape with one or more enclosed tubular sections. As such, the reinforcement insert 20 may be referred to as a tubular insert.

The reinforcement insert 20 is provided with one or more lateral crush control features to increase impact energy absorption by controlling lateral compression and deformation of the rocker assembly 10 undergoing side impact forces delivered to the outer sill member, such as forces delivered by a side pole impactor. For example, as shown in FIGS. 3-4A, crush channels 22 are disposed along opposing upper and lower sides of the reinforcement insert 20. The crush channels 22 are arranged to allow for the reinforcement insert 20 to crush laterally like an accordion. This type of accordion-style crush can limit cracking and material failures by controlling how the section crushes. The controlled crush provided by the crush channels 22 also adds to the material stack up later in the event, leading to more energy absorption overall.

It is contemplated that the reinforcement insert of the disclosed rocker assembly may be incorporated in other types of structural beams, such as in frames and structures of automotive and other vehicles. Also, the reinforcement insert may be used in other structural frame components and in impact energy management beams that are configured to undergo impact loads at various sections of the beam and absorb such impact loads in a desirable manner. For example, as shown in FIG. 2, a frame 102 of a vehicle 100 has multiple structural beams, one or all of which may be provided with internal reinforcements as described herein.

To form the external structure 12, the inner sill member 14 has an upper flange 14a attached along an upper flange 16a of the outer sill member 16. The inner sill member 14 also has a lower flange 14b of the inner sill member 14 attached along a lower flange 16b of the outer sill member 16. Such attachment of the inner and outer sill members 14, 16 may be a direct contact engagement or may be indirectly attached with an intermediary, such as a flange, plate, or bracket, sandwiched between the upper and lower flanges 14a, 14b, 16a, 16b. As shown in FIGS. 3-4B, the upper and lower flanges 14a, 14b, 16a, 16b are provided along the upper and lower edges of the respective inner and outer sill members 14, 16. The upper and lower flanges 14a, 14b, 16a, 16b are also substantially planar and oriented in a generally vertical configuration, such as to attach in direct contact along sections of the length of the rocker assembly 10 (FIG. 4A) and to also attach indirectly at discrete sections, where support brackets 62 are arranged between the flanges (FIG. 4B). The upper and lower flanges 14a, 14b, 16a, 16b are attached together via welding, although adhesive and/or mechanical fasteners may be used in addition or in the alternative to welding in other examples of the rocker assembly. The inner and outer sill members 14, 16 shown in FIG. 3 are steel, although it is contemplated that other examples may include alterative or multiple materials, such as steel, aluminum, and/or composites.

The intermediate portions of the inner and outer sill members 14, 16 are generally provided between the upper and lower flanges 14a, 14b, 16a, 16b and are shaped with a generally concave transverse cross-sectional shape, such as the exemplary C-shaped sections of the inner and outer sill members 14, 16 shown in FIGS. 4A and 4B. The intermediate portion of the inner sill member 14 has an upper wall section 24, an innermost wall section 26, and a lower wall section 28 that are each generally planar in shape. Similarly, the intermediate portion of the outer sill member 16 has an upper wall section 30, an outermost wall section 32, and a lower wall section 34 that are each generally planar in shape.

As shown in FIGS. 4A and 4B, the upper wall sections 24, 30 have a substantially equal length to the corresponding lower wall sections 26, 34. Also, the upper and lower wall sections 24, 26, 30, 34 are angled from a horizontal orientation, with each pair of upper and lower wall sections similarly angled. As a result of the substantially equal lengths and angles, the upper and lower flanges 14a, 14b, 16a, 16b shown in FIGS. 4A and 4B are vertically aligned with each other. In other examples, such as shown in FIG. 8A, the upper and lower flanges of the external structure may be offset from each other. Also, the cross-sectional profile of the inner and outer panels 14, 16 may be generally consistent along the length of the rocker assembly, such as shown in the examples shown in FIGS. 3-6, or may be have some inconsistent features along the lengths, such as to accommodate door pillar engagement as shown in the example in FIGS. 7 and 8.

As shown in FIGS. 3-4B, the reinforcement insert 20 is disposed within the elongated hollow space 18, extending longitudinally along the entire length of inner sill member 14 and along a portion of the length of the outer sill member 16. In other examples, the reinforcement insert may extend along a different longitudinal extent of the hollow external structure, such as within or beyond the lengths of the outer and inner sill members. The crush control features of the reinforcement insert 20 may be integrally formed in the reinforcement insert 20, such as the crush channels 22 that extend consistently along the length of the reinforcement insert 20. As shown in FIGS. 4A and 4B, the crush channels 22 protrude into an interior volume 36 of both tubular shapes of the reinforcement insert 20. However, it is also contemplated that one or more crush channels may protrude outward along the upper or lower wall of the reinforcement insert away from the interior volume. Also, as shown in FIGS. 4A and 4B, the crush channels 22 are arranged at opposing sides of the interior volume 36 for side impact forces to laterally deform the reinforcement insert 20 inward at the crush channels 22, such as to provide an accordion-style lateral crush pattern. In other examples, a single crush channel may be provided or additional crush channels may be utilized. The crush channels may be arranged at the upper and lower walls of the outer tubular section without crush channels in the other tubular section or sections, or alternatively, the crush channels may instead be disposed at the upper and lower walls of the inner tubular section without crush channels in the outer tubular section or sections, such as shown in FIG. 8A.

The crush channels in some examples are configured to simultaneously deform under the side impact forces at the outer sill member. For example, as shown in FIGS. 4A and 4B, the crush channels 22 are disposed at opposing sides of the reinforcement insert in an alignment that is generally perpendicular to the orientation of a horizontal side impact force. As such, the crush channels 22 may be mirrored across the interior volume of the outer and inner tubular sections so as to be vertically aligned with each other for optimized crush as a result of a horizontal side impact force. In other examples, the crush channels may be disposed in a laterally staggered alignment from each other, such as laterally staggered from each other across an enclosed interior volume or staggered with the crush channels arranged at separate tubular sections of the reinforcement insert.

The reinforcement insert 20 has an upper wall 38 and a lower wall 40 that border opposite sides of an interior volume 36 of the reinforcement insert 20. As shown in FIGS. 4A and 4B, the upper and lower walls 38, 40 of the reinforcement insert 20 are disposed in planar parallel alignment with each other. In other examples, the upper and lower walls may be tapered or angled toward or away from each other or may have a non-planar shape, such as a curved or rounded transition along the width of the respective wall. The upper and lower walls 38, 40 of the reinforcement insert 20 each have a crush channel 22 protruding into the interior volume 36 and extending longitudinally along the respective upper and lower walls at opposing sides of the interior volume 36. Again, in other examples, one or more crush channel may protrude outward from the interior volume. As also shown in FIGS. 4A and 4B, the reinforcement insert 20 includes an outer tubular section 42 and an inner tubular section 44 integrally formed together and disposed laterally adjacent to each other. The outer tubular section 42 and the inner tubular section 44 share a common center wall 46 that extends vertically between the upper and lower walls 38, 40 of the reinforcement insert 20 and divides the interior volumes of the respective outer and inner tubular sections 42, 44.

As further shown in FIGS. 4A and 4B, the outer tubular section 42 of the reinforcement insert 20 has an outer wall 48 that is integrally interconnected between the upper and lower walls 38, 40 of the reinforcement insert 20. The outer wall 48 faces the outermost wall section 32 of the outer sill member 16 and contacts the outermost wall section 32. Similarly, the inner tubular section 44 has an inner wall 50 integrally interconnected between the upper and lower walls 38, 40 of the reinforcement insert 20. The inner wall 50 faces the innermost wall section 26 of the inner sill member 14 and contacts the innermost wall section 26. Thus, the reinforcement insert may have a lateral width between the inner and outer walls that is sized to fit tight or occupy the distance between the inner sill and the outer sill, such as shown in FIGS. 4A and 4B. In other examples, however, the reinforcement insert may fit tight to only one of the inner and outer sill members and be gapped to the other side, or alternatively may be designed with a gap on both sides, so as to float in the space between the inner and outer sill members. Also, although the reinforcement insert 20 shown in FIGS. 4A and 4B is spaced from the upper wall sections 24, 30 and the lower wall sections 28, 34, it is contemplated that the spacing may be reduced or generally eliminated due to the ability of the crush control features to causes inward deformation upon lateral impact forces at the outer side of the rocker assembly, such as to deform in an accordion shape within the exterior structure of the rocker assembly.

To form the tubular insert 20 shown in FIGS. 3-4B, a metal sheet is roll formed to have the outer tubular section 42 and the inner tubular section 44 laterally adjacent to each other, sharing the common center wall 46. The outer sections of the metal sheet that form the two adjacent tubular sections extend from opposing sides of a center section of the metal sheet that forms the common center wall 46. As oriented in FIGS. 3-4B, the two adjacent tubular sections 14, 16 are defined on opposing sides of the common center wall 46 by the upper walls 52, 54, the lower walls 56, 58, an outer wall 48, and an inner wall 50. The crush channels 22 are roll formed into the metal sheet at the upper walls 52, 54 and the lower walls 56, 58. The crush channels 22 have a width of about 10%-40% of a width of the corresponding wall section (or more preferably about 20%-30% of the wall width) and has a depth about equal to the width dimension. As shown in FIGS. 4A and 4B, the illustrated crush channels 20 are semicircular shaped. It is also contemplated that a depth and size of the crush channels can be made shallow, deeper, wider, narrower, or otherwise modified for the desired lateral crush characteristics.

The metal sheet used to form the reinforcement insert in FIGS. 4A and 4B is a steel material, such as an advanced high strength steel (AHHS), having a thickness of 0.8 mm to 1.4 mm or approximately between 1 mm and 1.5 mm. Also, the sheet 12 may have a tensile strength of about 800 to 2000 MPa (i.e. about 120 to 290 ksi). It is also contemplated that the reinforcement insert can be made of a sheet having a different thickness and may be made with one or a combination of different materials, such as steel, aluminum, and/or a composite.

To hold the roll formed sheet in the tubular shape of the reinforcement insert 20, one edge 60a of the sheet is attached via welding to a lower end of the center wall 46 and the other edge 60b is attached via welding to the upper wall 52 near the upper end of the center wall 46. The upper walls 52, 54 and lower walls 56, 58 of the adjacent tubular sections 42, 44 are substantially aligned with each other to form the respective upper and lower walls 38, 40 of the reinforcement insert. Further, the outer and inner walls 28, 30 are substantially parallel with each other and the common center wall 18 and generally perpendicular with the upper and lower walls 20, 22, 24, 26. Additional examples of the reinforcement insert may assume various shapes and orientations from that shown in FIGS. 4A and 4B and may include alternatively dimensional proportions, such as for different applications of the insert.

The reinforcement insert may be supported and/or attached within the external structure in various ways. For example, a series of brackets 62 (FIG. 4B) are attached between the upper and lower flanges 14a, 14b, 16a, 16b of the outer and inner sill members 14, 16 spaced along the length of the reinforcement insert. As shown in FIG. 4B, the brackets 62 have an L-shape with inner portion 64 attached to the upper and lower walls 38, 40 and an outer portion 66 attached with welding between the upper and lower flanges 14a, 14b, 16a, 16b to support the reinforcement insert 20 in the hollow space 18. In other examples, the reinforcement insert may also or alternatively be attached at an interior surface of the outer sill member or the inner sill member, such as via a weld, a fastener, and/or an adhesive.

Figure 5:
FIG. 5 is a top plan view of another example of a rocker assembly.
Figure 6:
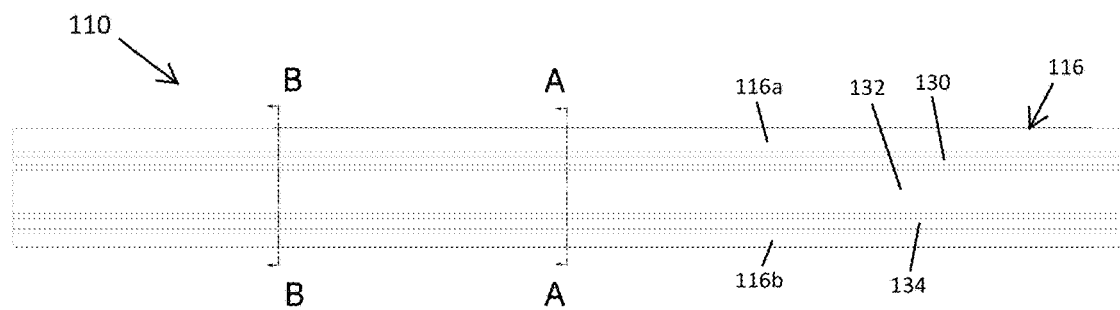
FIG. 6 is a side elevation view of the rocker assembly shown in FIG. 5.
Figure 6A:
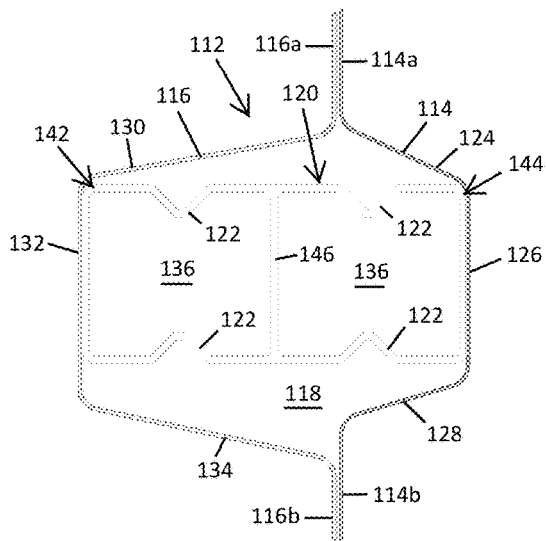
FIG. 6A is a cross-sectional view of the rocker assembly taken at line A-A in FIG. 6.
Figure 6B:
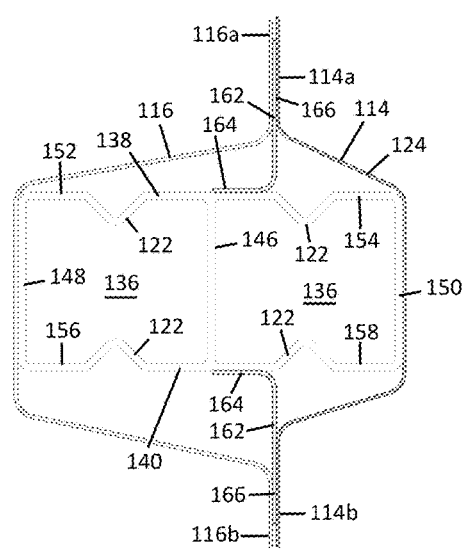
FIG. 6B is a cross-sectional view of the rocker assembly taken at line B-B in FIG. 6.

Referring to FIGS. 5-6B, the reinforcement insert 120 is disposed within the hollow space 118, extending longitudinally along the entire inner sill member 114 and along a portion of the outer sill member 116. The crush channels 122 of the reinforcement insert 120 are integrally formed in the reinforcement insert 120 and extend consistently along the length of the reinforcement insert 120. As shown in FIGS. 6A and 6B, reinforcement insert 120 is longitudinally extruded, such as with an aluminum alloy, to have an outer tubular section 142 and an inner tubular section 144 that share a common wall 146 integrally interconnecting between the upper and lower walls 138, 140 of the reinforcement insert 120. The upper wall 138 and the lower wall 140 that border opposite sides of the interior volume 136 of the reinforcement insert 120 and are disposed in planar parallel alignment with each other. The crush channels 122 are extruded into the upper and lower walls 138, 140 to extend into an interior volume 136 of the respective tubular shapes of the reinforcement insert 120. The crush channels 122 shown in FIGS. 6A and 6B have a V-shape to assist with initiating the lateral crush of the reinforcement insert at the crush channels. The crush channels 122 are arranged at opposing sides of the interior volume 136 for side impact forces to laterally deform the reinforcement insert 120 inward at the crush channels 122, such as to provide an accordion-style lateral crush pattern.

As shown in FIGS. 6A and 6B, reinforcement insert 120 includes an outer tubular section 142 and an inner tubular section 144 integrally formed together and disposed laterally adjacent to each other. The crush channels 122 are mirrored across the interior volumes 136 of the outer and inner tubular sections 142, 144, so as to be vertically aligned with each other. As also shown in FIGS. 6A and 6B, the outer tubular section 142 of the reinforcement insert 120 has an outer wall 148 that is integrally interconnected between the upper and lower walls 138, 140 of the reinforcement insert 120. The outer wall 148 faces the outermost wall section 132 of the outer sill member 116 and contacts the outermost wall section 132. Similarly, the inner tubular section 144 has an inner wall 150 integrally interconnected between the upper and lower walls 138, 140 of the reinforcement insert 120. The inner wall 150 faces the innermost wall section 126 of the inner sill member 114 and contacts the innermost wall section 126.

To support the reinforcement insert 120 within the external structure 112, a series of brackets 162 are attached between the upper and lower flanges 114a, 114b, 116a, 116b of the outer and inner sill members 114, 116. As shown in FIG. 6B, the brackets 162 have an L-shape with inner portion 164 attached to the upper and lower walls 138, 140 and an outer portion 166 attached between the upper and lower flanges 114a, 114b, 116a, 116b to support the reinforcement insert 120 in the hollow space 118. The attachment of the bracket to the reinforcement insert and the external structure may be done with a weld, a fastener, an adhesive, and/or a material intermediary, such as in a manner to prevent galvanic corrosion.

Also, in some implementations, the reinforcement insert may include a flange that is attached between upper flanges of the outer and inner sill members, where the flange attaches to the external structure of the rocker assembly to support the tubular insert in the hollow space of the external structure. As shown in FIG. 8A, the reinforcement insert 220 includes an upper flange portion 270 that integrally extends upper ward from the crushable insert portion 268 and a lower flange portion 272 that integrally extends downward from the crushable insert portion 268. The upper and lower flange portions 270, 272 attach between the respective upper and lower flanges 214a, 214b, 216a, 216b of the inner and outer sill members 214, 216 edges or flanges of the panels 212, 214 to secure the reinforcement insert 220 relative to the inner and outer sill members 214, 216. For example, the flange portions are spot welded between the first and second panels 214, 216, although with alternative welding methods or different attachment means may be used, such as adhesive, mechanical fasteners, or combinations thereof. In other implementations, an integral flange of the reinforcement insert may also be used to attach to the vehicle frame or other component parts.

Figure 7:
FIG. 7 is a top plan view of a further example of a rocker assembly.
Figure 8:
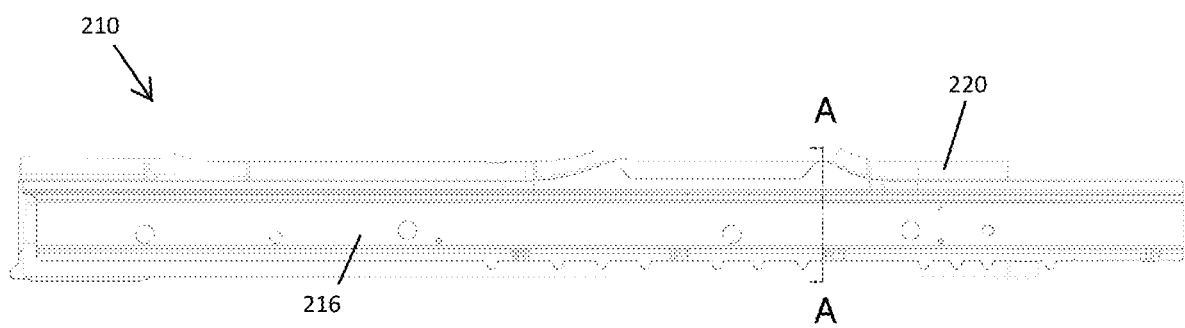
FIG. 8 is a side elevation view of the rocker assembly shown in FIG. 7.
Figure 8A:
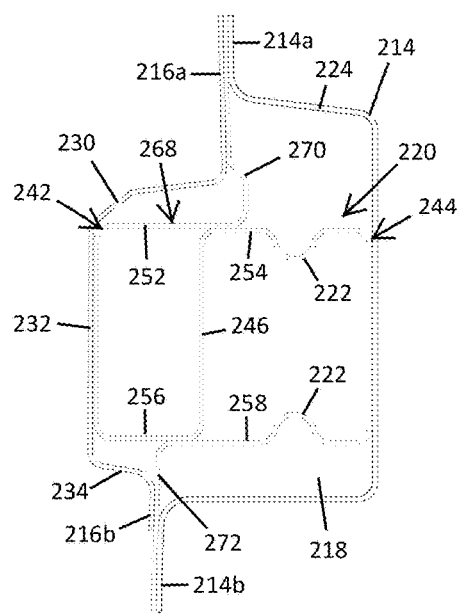
FIG. 8A is a cross-sectional view of the rocker assembly taken at line A-A in FIG. 8.

With further reference to FIGS. 7-8A, the reinforcement insert 220 is roll formed from a metal sheet to provide the crushable insert portion 268 and the upper and lower flange portions 270, 272 as integral sections of the metal sheet, so as to extend longitudinally and continuously along a length of the reinforcement insert 220. The upper and lower flange portions 270, 272 of the reinforcement insert 220 are provided at edge portions of the metal sheet. As shown in FIG. 8A, the wall sections of the crushable insert portion 268 include a common center wall 246 dividing two adjacent tubular sections 214, 216, upper walls 252, 254, lower walls 256, 258, an outer wall 248, and an inner wall 250. The crush channels 222 are roll formed into the metal sheet at the upper walls 252, 254 and the lower walls 256, 258. After welds are formed along the upper and lower walls to enclose the adjacent tubular sections 242, 244, the upper flange portion 270 extends upward from the upper wall 254 and the lower flange portion 272 extends downward from the lower wall 256.

As further shown in FIG. 8A, the intermediate portion of the outer sill member 216 has an upper wall section 230 that is formed in a stepped shape that integrally interconnects with a generally planar and vertically oriented, outermost wall section 232. The outermost wall section 232 extends down to integrally interconnect with a generally planar lower wall section 234 that is slightly angled from a horizontal orientation. The stepped shape of the upper wall section 230 reduces the distance across the hollow interior 218 between the inner and outer sill members 214, 216 at the upper portion of the inner sill member 214.

Also for purposes of this disclosure, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle rocker assembly comprising:
   an outer sill member;
   an inner sill member attached longitudinally along the outer sill member to define a hollow space between the inner and outer sill members; and
   a tubular insert disposed in and extending longitudinally along the hollow space, the tubular insert having an upper wall and a lower wall bordering opposite sides of an interior volume of the tubular insert, the tubular insert comprising a metal sheet that integrally forms a closed tubular section that surrounds the interior volume to form the upper wall and the lower wall of the tubular insert, the closed tubular section having an interior wall extending along the tubular insert that divides the interior volume,
   wherein at least one of the upper wall or the lower wall of the tubular insert has a crush channel extending longitudinally along the tubular insert, and
   wherein the tubular insert is configured for a side impact force at the outer sill member to initiate lateral deformation of the tubular insert at the crush channel.

2. The vehicle rocker assembly of claim 1, wherein the crush channel protrudes into the interior volume of the tubular insert.

3. The vehicle rocker assembly of claim 1, wherein the upper wall and the lower wall each include the crush channel disposed along the respective upper and lower walls at opposing sides of the interior volume.

4. The vehicle rocker assembly of claim 3, wherein the crush channels are vertically aligned across the interior volume of the tubular insert.

5. The vehicle rocker assembly of claim 3, wherein the upper and lower walls of the tubular insert are disposed in planar parallel alignment with each other.

6. The vehicle rocker assembly of claim 1, wherein the closed tubular section comprises an outer tubular section and an inner tubular section integrally formed together and sharing the interior wall so as to be disposed laterally adjacent to each other.

7. The vehicle rocker assembly of claim 6, wherein the interior wall vertically extends between the upper and lower walls of the tubular insert.

8. The vehicle rocker assembly of claim 6, wherein the outer tubular section includes an outer wall attached at the outer sill member.

9. The vehicle rocker assembly of claim 6, wherein the inner and outer tubular sections each include crush channels disposed along the respective upper and lower walls of the inner and outer tubular sections.

10. The vehicle rocker assembly of claim 1, wherein the tubular insert comprises an outer tubular section and an inner tubular section, and wherein the interior wall forms a portion of each of the outer and inner tubular sections.

11. A vehicle rocker assembly comprising:
    a sill structure having an outer sill member attached along an inner sill member;
    a reinforcement insert disposed in a hollow interior between the outer and inner sill members, the reinforcement insert comprising a metal sheet that integrally forms a closed tubular section having an outer tubular section and an inner tubular section integrally formed together and disposed laterally adjacent to each other, the closed tubular section having a common center wall dividing the outer and inner tubular sections; and
    a crush control feature integrally disposed at a wall of the reinforcement insert and extending longitudinally along a length of the reinforcement insert,
    wherein the crush control feature is configured for a side impact force at the outer sill member to laterally deform the reinforcement insert in an accordion-style crush.

12. The vehicle rocker assembly of claim 11, wherein the common center wall of the reinforcement insert extends vertically between upper and lower walls of the reinforcement insert.

13. The vehicle rocker assembly of claim 12, wherein the crush control feature comprises a first crush channel disposed at the upper wall and a second crush channel disposed at a the lower wall of the reinforcement insert.

14. The vehicle rocker assembly of claim 13, wherein the first and second crush channels are mirrored across an interior volume of the reinforcement insert.

15. The vehicle rocker assembly of claim 13, wherein the first and second crush channels are vertically aligned across an interior volume of the reinforcement insert.

16. The vehicle rocker assembly of claim 11, wherein the tubular insert is fixed at an interior surface of the sill structure via at least one of a weld, a fastener, or an adhesive.

17. A vehicle rocker assembly comprising:
    an outer sill member;

an inner sill member attached longitudinally along the outer sill member to define a hollow space between the inner and outer sill members; and a tubular insert disposed in and extending longitudinally along the hollow space, the tubular insert comprising a metal sheet that integrally forms a closed tubular section that surrounds an interior volume to form an upper wall and a lower wall of the tubular insert, the closed tubular section, comprising an outer tubular section and an inner tubular section integrally formed together and divided by a common center wall extending along the tubular insert, wherein at least one of the outer tubular section or the inner tubular section includes an upper crush channel and a lower crush channel disposed at the respective upper and lower walls of at least one of the outer or inner tubular section, wherein the upper and lower crush channels extend longitudinally along the tubular insert and are configured for a side impact force at the outer sill member to initiate lateral deformation of the tubular insert.

18. The vehicle rocker assembly of claim 17, wherein the upper and lower crush channels are vertically aligned on the respective outer and inner tubular section of the tubular insert.

19. The vehicle rocker assembly of claim 17, wherein the upper and lower walls of the tubular insert are disposed in planar parallel alignment with each other, and wherein the common center wall extends vertically between the upper and lower walls of the tubular insert.

\* \* \* \* \*